(12) United States Patent
Wada et al.

(10) Patent No.: US 8,199,265 B2
(45) Date of Patent: Jun. 12, 2012

(54) OPTICAL WAVEFORM SHAPING DEVICE

(75) Inventors: Naoya Wada, Koganei (JP); Seitetsu Boku, Ageo (JP); Takuya Yoda, Ageo (JP); Yuki Komai, Tokyo (JP); Fumi Moritsuka, Tokyo (JP); Kashiko Kodate, Tokyo (JP)

(73) Assignee: National Institute of Information and Communications Technology, Tokyo (JP)

( * ) Notice: Subject to any disclaimer, the term of this patent is extended or adjusted under 35 U.S.C. 154(b) by 219 days.

(21) Appl. No.: 12/664,661

(22) PCT Filed: Jun. 13, 2008

(86) PCT No.: PCT/JP2008/001539
§ 371 (c)(1),
(2), (4) Date: Dec. 30, 2009

(87) PCT Pub. No.: WO2008/155894
PCT Pub. Date: Dec. 24, 2008

(65) Prior Publication Data
US 2010/0157179 A1 Jun. 24, 2010

(30) Foreign Application Priority Data
Jun. 15, 2007 (JP) ................... 2007-159592

(51) Int. Cl.
*G02F 1/1335* (2006.01)
(52) U.S. Cl. ........................................... 349/18
(58) Field of Classification Search ............ 349/18
See application file for complete search history.

(56) References Cited

U.S. PATENT DOCUMENTS

| 6,826,209 | B1 | 11/2004 | Morita et al. |
| 2008/0089698 | A1* | 4/2008 | Jiang et al. ............... 398/189 |
| 2010/0141857 | A1* | 6/2010 | Wada et al. ............... 349/18 |

FOREIGN PATENT DOCUMENTS

| JP | 11-052348 A | 2/1999 |
| JP | 11-174433 A | 7/1999 |
| JP | 11-194345 A | 7/1999 |
| JP | 11-212081 A | 8/1999 |
| JP | 2000-187167 A | 7/2000 |
| JP | 2001-42275 A | 2/2001 |

OTHER PUBLICATIONS

Examination report for counterpart Canadian application No. 2,690,852 issued by the Canadian Intellectual Property Office on Jan. 28, 2011 (3 pages).
Yuki Komai et al., "Pulse Synthesize Using Arrayed-Waveguide Grating", Journal of Japan Women's University, Faculty of Science, Mar. 31, 2004, No. 12, pp. 15 to 24.

* cited by examiner

*Primary Examiner* — Sarah Hahm
(74) *Attorney, Agent, or Firm* — Pyprus Pte Ltd

(57) ABSTRACT

The present invention provides an optical waveform shaping device (10) of high resolution comprising a branching filter (1) for branching the light beam from a light source into light beams of each frequency, a condensing part (2) for condensing a plurality of light beams branched by the branching filter (1), a polarizing plate (3) for adjusting the polarization planes of the light beams having passed through the condensing part (2), and a spatial light modulator (4) having a phase modulation part and an intensity modulation part where the light beams having passed through the polarizing plate (3) are incident.

10 Claims, 19 Drawing Sheets

Fig.4
Fig.4(a)
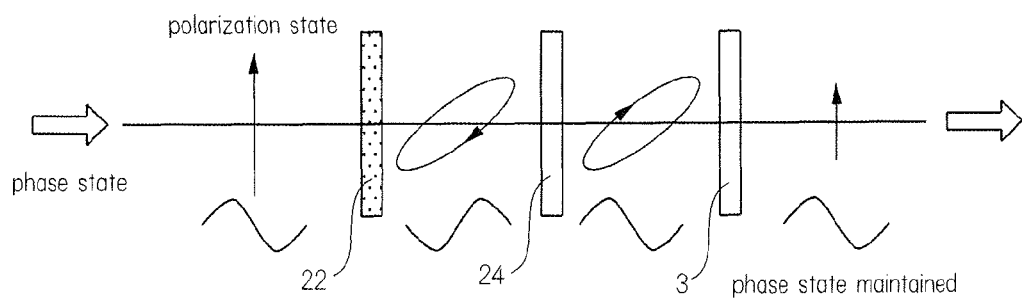
Fig.4(b) PRIOR ART
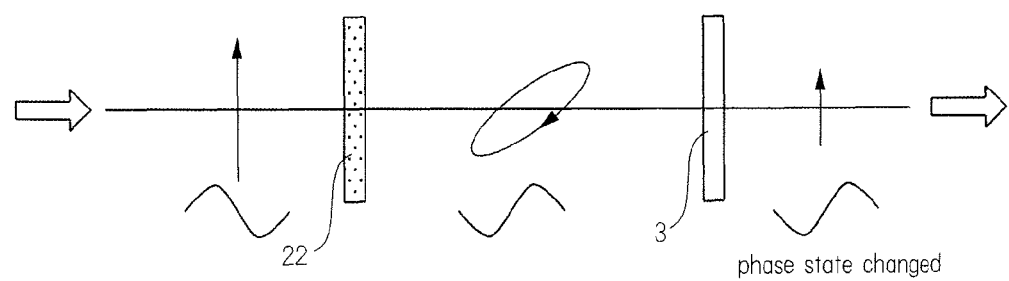

Fig.6
Fig.6(a)
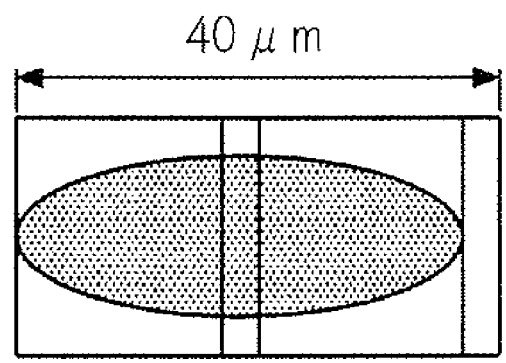
Fig.6(b)
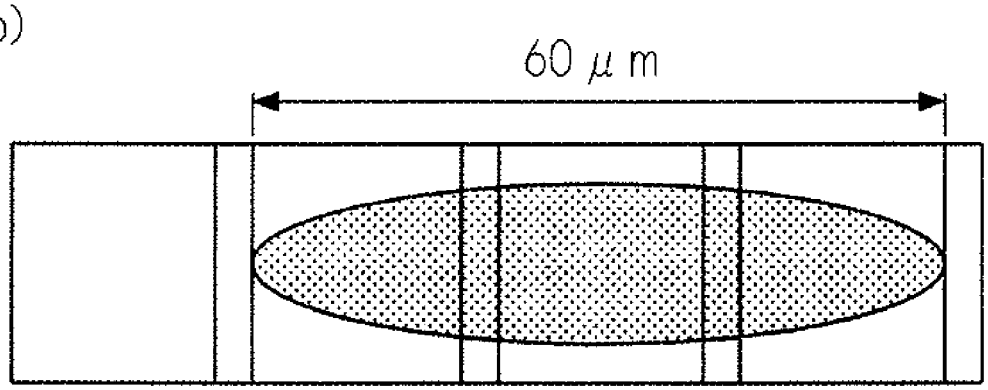

Fig. 7
Fig. 7(a)
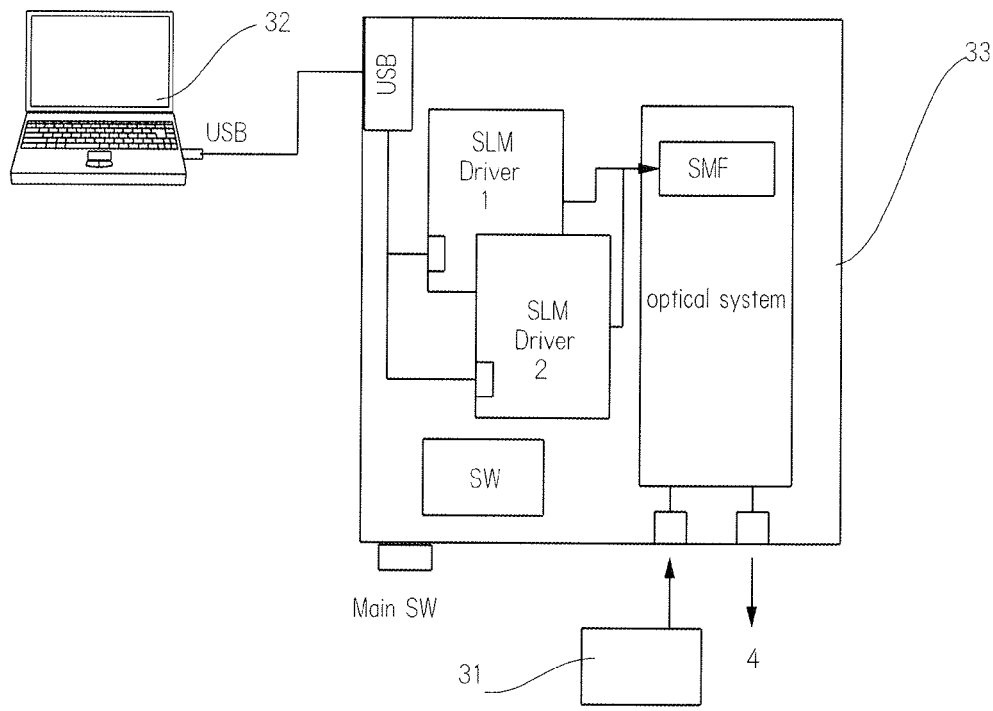
Fig. 7(b)
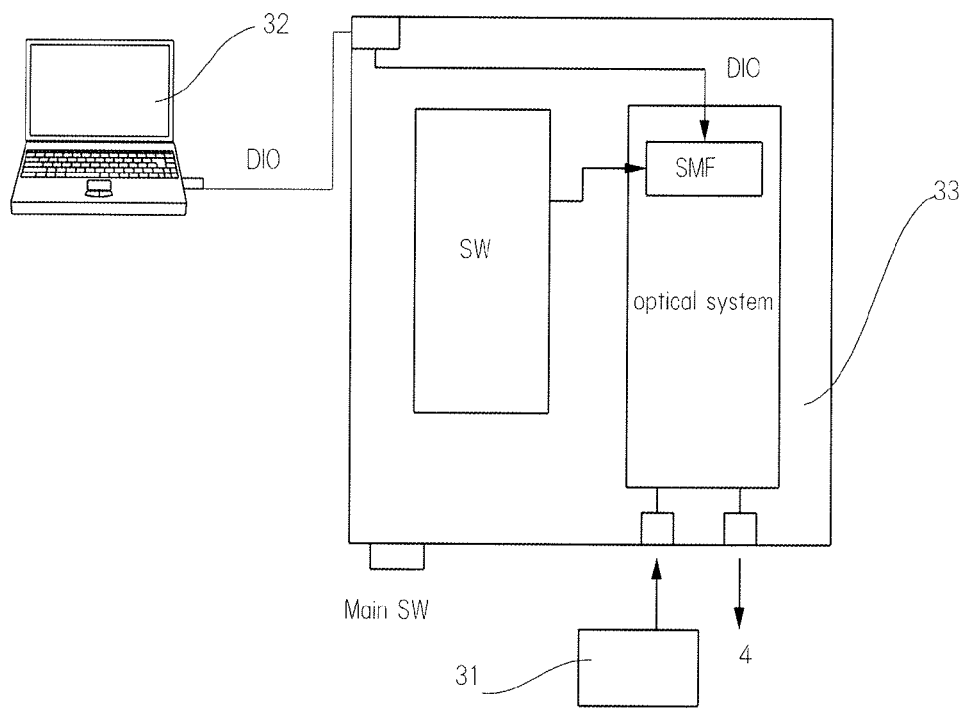

Fig.9
Fig.9(a)
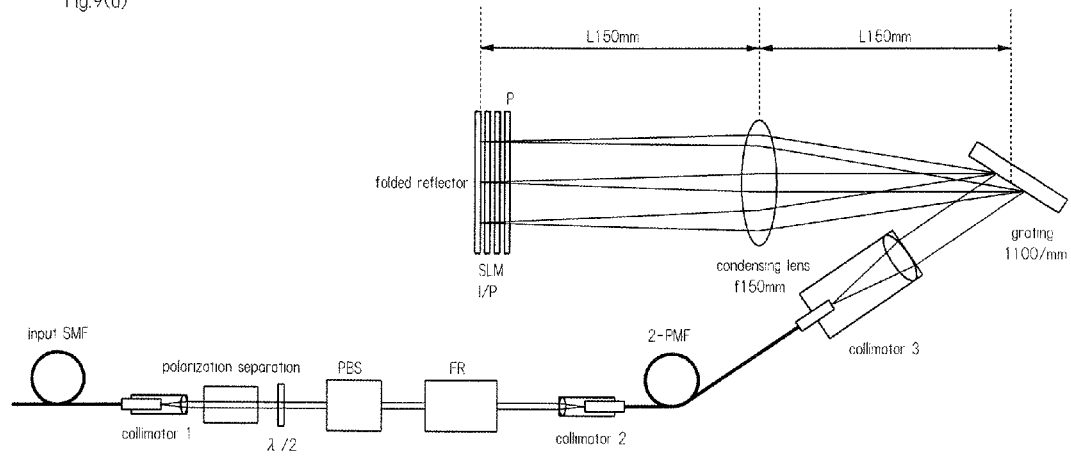
Fig.9(b)
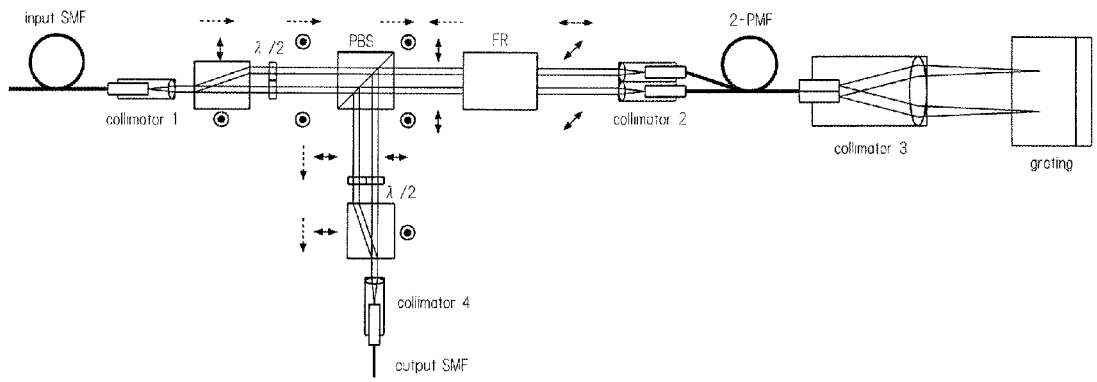

Fig.11
Fig.11(a)
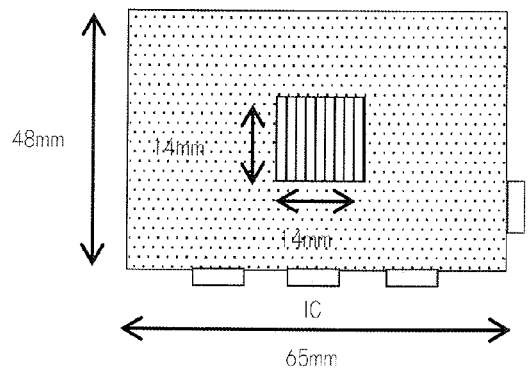
Fig.11(b)
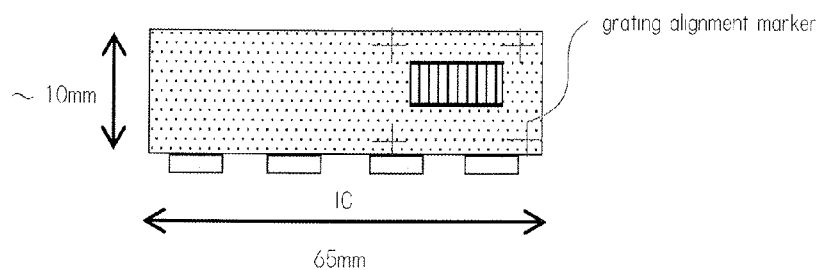
Fig.11(c)
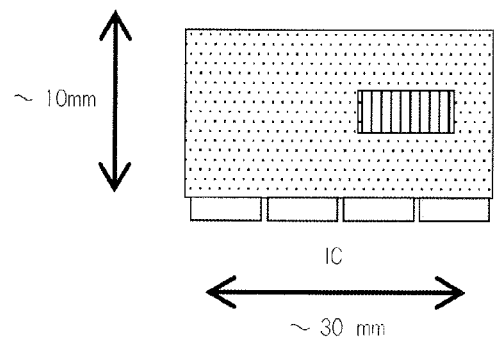

Fig.12
Fig.12(a)
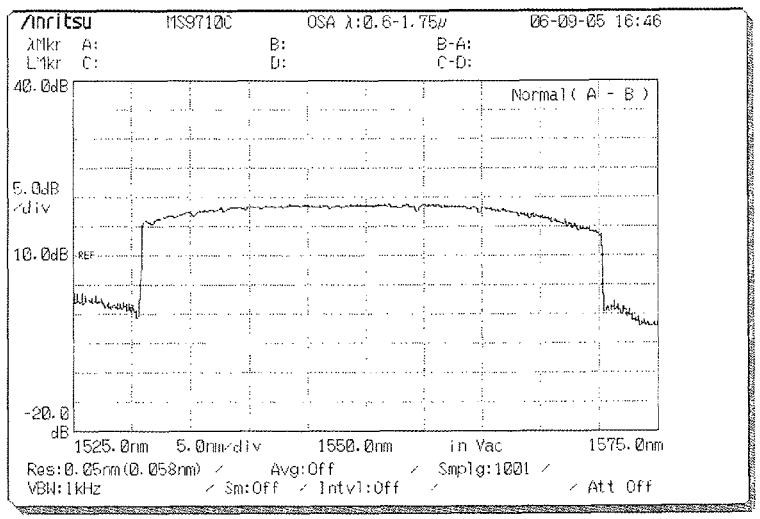
Fig.12(b)
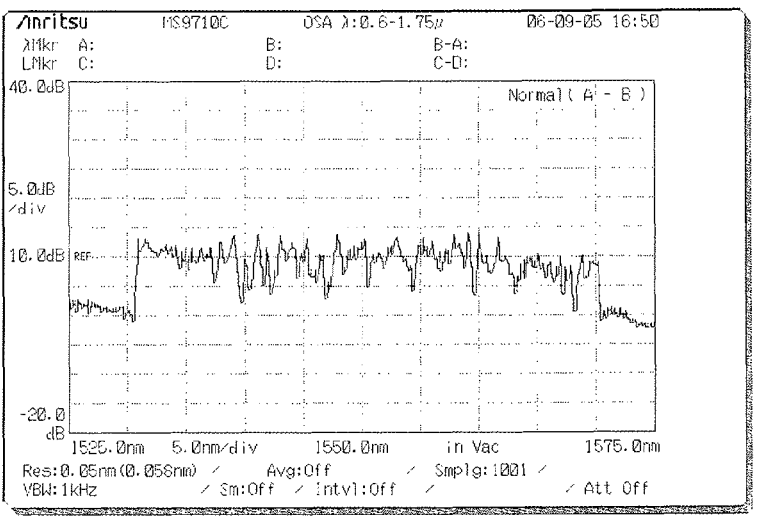
Fig.12(c)
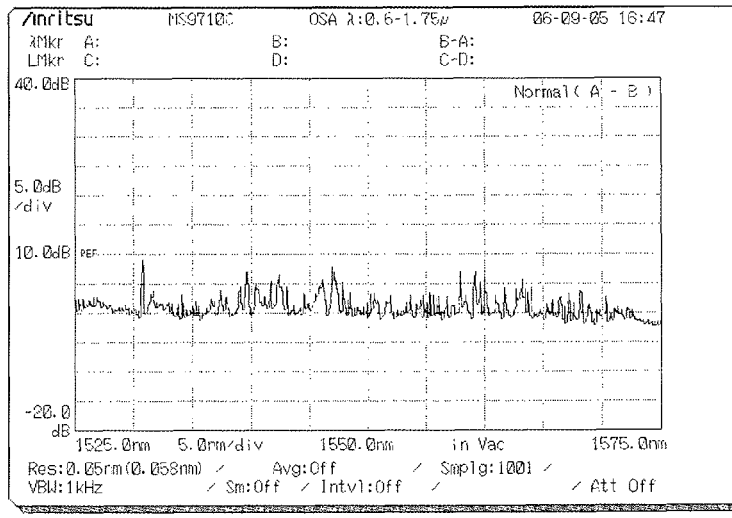

Fig.13
Fig.13(a)
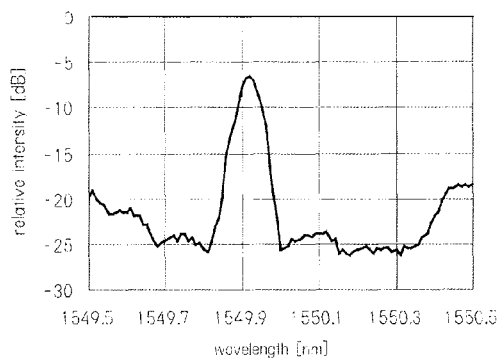
Fig.13(b)
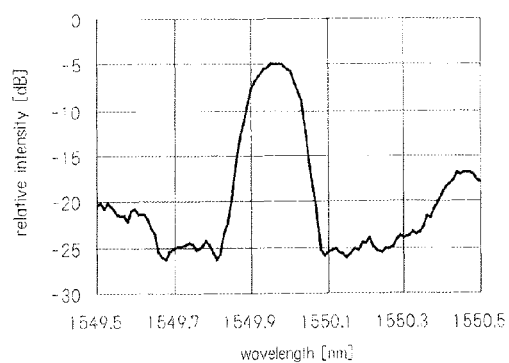
Fig.13(c)
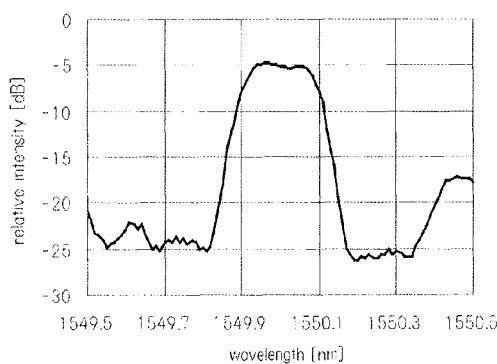
Fig.13(d)
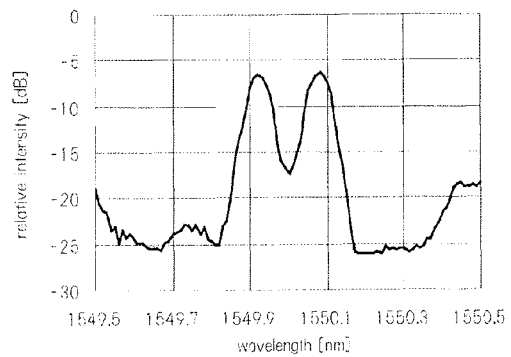

OPTICAL WAVEFORM SHAPING DEVICE

TECHNICAL FIELD

The present invention relates to an optical waveform shaping device and so on.

BACKGROUND ART

The waveform of an optical signal transmitted in an optical transmission system degrades by ASE noise, non-linear characteristics of an optical fiber, etc., resulting in degradation of transmission quality. In such a case, the degraded waveform of the optical signal is recovered by an optical waveform shaping device for shaping the waveform an optical signal. Furthermore, an optical waveform shaping device is used in an observation device using a femtosecond laser etc., for example, as it is important to shape a laser waveform.

For example, JP-A 2001-42274 discloses an optical waveform shaping device with a spatial light modulator for phase modulation and a spatial phase modulator for intensity modulation. However, the optical waveform shaping device disclosed in the publication uses two modulators each having a grass substrate, which inevitably leads to the expansion of the diameter of a beam. Thus, there is a problem of low resolution.

Patent document 1: JP-A 2003-90926
Patent document 2: JP-A 2002-131710

DISCLOSURE OF THE INVENTION

Problems to be Solved by the Invention

It is an object of the present invention to provide an optical waveform shaping device of high resolution.

It is an object of the present invention to provide an optical waveform shaping device of high resolution which is capable of phase shift compensation associated with optical intensity modulation.

It is an object of the present invention to provide an optical waveform shaping device with a passband generally rectangular in shape. It is an object of the present invention to provide an optical waveform shaping device which is capable of ultrafast optical clock generation of the terahertz order.

It is an object of the present invention to provide a band variable optical waveform shaping device which is capable of miniaturization.

Means for Solving Problems

The present invention is basically based on a knowledge that the use of a spatial light modulator having a phase modulation part and an intensity modulation part can provide an optical waveform shaping device of high resolution, resulting in a new applied technology including ultrafast optical clock generation of the terahertz order. That is, the present specification discloses the following invention:

An optical waveform shaping device (10) comprising:
a branching filter (1) for branching the light beam from a light source into light beams of each frequency;
a condensing part (2) for condensing a plurality of light beams branched by the branching filter (1);
a polarizing plate (3) for adjusting the polarization planes of the light beams having passed through the condensing part (2); and
a spatial light modulator (4) having a phase modulation part and an intensity modulation part where the light beams having passed through the polarizing plate (3) are incident.

The optical waveform shaping device as claimed in Claim 1, wherein the branching filter (1) comprises a high-dispersion element.

The optical waveform shaping device as claimed in Claim 1,
wherein the spatial light modulator (4) comprises:
an intensity modulation part (22) having a plurality of liquid crystal cells (21) formed in a line or in a matrix; and
a phase modulation part (24) having a plurality of liquid crystal cells (23) corresponding to the liquid crystal cells (21) of the intensity modulation part,
and wherein the orientation of liquid crystals of the intensity modulation part is 45 degrees offset from the orientation of liquid crystals of the phase modulation part.

The optical waveform shaping device as claimed in Claim 1,
wherein the spatial light modulator (4) comprises:
an intensity modulation part (22) having a plurality of liquid crystal cells (21) formed in a line or in a matrix; and
a phase modulation part (24) having a plurality of liquid crystal cells (23) corresponding to the liquid crystal cells (21) of the intensity modulation part,
wherein each of the liquid crystal (21) of the intensity modulation part (22) and the liquid crystal (23) of the phase modulation part (24) comprises liquid crystal substances and electrodes which exist holding the liquid crystal substances therebetween,
and wherein the optical waveform shaping device comprises:
a detection part (31) for detecting output light from the optical waveform shaping device (21) when the intensity modulation by the intensity modulation part (22) is performed;
a control device (32) for receiving information on the optical phase shifting of each frequency detected by the detection part (31) and controlling the voltage applied to the electrodes of each liquid crystal cell (23) of the phase modulation part (24);
a voltage adjustment part (33) for each liquid crystal cell of the phase modulation part (24) which outputs the voltage applied to the electrodes of each liquid crystal cell (23) of the phase modulator (24) in accordance with the control instructions from the control device (32).

The optical waveform shaping device (10) as claimed in Claim 1, further comprising a reflective part (5) where the light beams having passed through the spatial light modulator (4) are incident.

The optical waveform shaping device (10) as claimed in Claim 1, further comprising a second condensing lens (11) where the light beams having passed through the spatial light modulator (4), and an optical multiplexer (12) where the light beams having passed through the second condensing lens (11) are incident to multiplex the light beams separated into a plurality of frequencies.

An optical waveform shaping device (10) comprising:
a grating (1) for branching the light beam from a light source into light beams of each frequency;
a condensing lens (2) for condensing the plurality of light beams branched by the grating (1);
a polarizing plate (3) for adjusting the polarization planes of the light beams having passed through the condensing lens (2);
a spatial light modulator (4) having a phase modulation part and an intensity modulation part where the light beams having passed through the polarizing plate (3) are incident,
wherein the orientation of liquid crystals of the phase modulation part is parallel to the polarization planes adjusted by the polarizing plate (3), the phase modulation part and the intensity modulation part each having a plurality of liquid crystal cells in a line or in a matrix existing in corresponding spatial positions, and the orientation of liquid crystals of the intensity modulation part is 45 degrees offset from the orientation of the liquid crystal of the phase modulation part; and a folded reflector where the light beams having passed through the spatial light modulator (4) are incident, wherein the light beam from a light source is frequency separated and is dispersed spatially by the grating (1), wherein the frequency separated and spatially dispersed light beams are condensed by the condensing lens (2), wherein the polarization planes of the condensed light beams are adjusted by the polarizing plate (3), and wherein the light beams with the polarization planes adjusted separately are subjected to separately controlled phase modulation and intensity modulation by the spatial light modulator (4), the light beams folded by the folded reflector (5), condensed through the condensing lens (2), and the frequency separated light beams multiplexed by the grating (1).

EFFECT OF THE INVENTION

The optical waveform shaping device of the present invention uses one spatial light modulator (4) having a phase modulation part and an intensity modulation part, and the phase modulation part and the intensity modulation part have a glass substrate in common, which prevents the expansion of the diameter of a beam, thereby providing high resolution.

The optical waveform shaping device of the present invention further feedbacks the phase shift associated with optical intensity modulation to the control voltage of liquid crystals, or adjusts the orientation of a polarizer and the liquid crystals in the phase modulation part of the spatial light modulator to compensate the phase shift associated with intensity modulation, which compensates the phase shift associated with the optical intensity modulation.

The optical waveform shaping device of the present invention can provide an optical waveform shaping device with a passband generally rectangular in shape as was confirmed in an actual device.

The optical waveform shaping device of the present invention can be used as a band variable optical waveform shaping device as the passbands of adjacent bands form continuous passbands.

The optical waveform shaping device of the present invention can be miniaturized precisely as optical elements can be omitted and the influences such as dispersion can be compensated in case it is a reflection type.

BEST MODE FOR CARRYING OUT THE INVENTION

FIG. 1 is a conceptual diagram showing an example of a configuration of an optical waveform shaping device of the present invention. As shown in FIG. 1, the optical waveform shaping device of the present invention comprises a branching filter (1) such as a grating, a condensing lens (2), a polarizing plate (3), a spatial light modulator (4) having a phase modulation part and an intensity modulation part, and a folded reflector (5). In FIG. 1, numeral 6 indicates a collimating lens.

The branching filter (1) is an element for branching the light from a light source into light beams of each frequency. As a branching filter, a grating, a prism, or a high-dispersion element such as a grism may be used. Alternatively, an AWG may be used. As a light source, white light or light containing a plurality of wavelengths of light, for example, may be used. Alternatively, pulsed light with a wavelength of approximately 1550 nm may be used. As for the light beam from a light source, the polarizing plane may be adjusted with a polarization adjuster, a polarizing plate, etc. Furthermore, the light beam from a light source may be polarized and separated into two kinds of light beams having mutually-perpendicular polarization planes, for example.

The condensing lens (2) serves as a condensing part for condensing a plurality of light beams condensed by the branching filter (1). A well-known condensing lens can preferably be used as a condensing lens. The condensing lens (2) may be provided in the spatial position where the light beams spatially dispersed by the grating (1) can be condensed and can be guided to a predetermined cells of the spatial light modulator (4).

A polarizing plate (3) is an optical element for adjusting the polarization plane of incident light having passed through the condensing lens (2). As a polarizing plate, a well-known polarizing plate or a polarizer can preferably be used. An interference film type polarizer is more preferable as the polarizing plate. The use of such an interference film type polarizer indicates the use of a polarizer with a large diameter, which leads to improvement of convenience.

The spatial light modulator (4) where the light beams having passed through the polarizing plate (3) is incident has a phase modulation part and an intensity modulation part each having a plurality of liquid crystal cells in a line or in a matrix existing in the corresponding spatial positions. For example, in the above Patent document 1, a spatial phase modulation part and a spatial intensity modulation part are separated from each other. On the other hand, in the present invention, a phase modulation part and an intensity modulation part are joined together and are arranged on a glass substrate. This can reduce the number of glass substrates used in a spatial light modulator to one, which can prevent the expansion of the diameter of a beam, thereby providing high resolution. In order to control unnecessary reflection, the phase modulation part and the intensity modulation part are preferably joined together so that each refractive index is matched. A plurality of liquid crystal cells in a line means a plurality of liquid crystal cells arranged in a straight line, while a plurality of liquid crystal cells in a matrix means a plurality of liquid crystal cells arranged in good order vertically and horizontally. The plurality of liquid crystal cells arranged in a straight line is more preferable. And the orientation of liquid crystals of the phase modulation part is parallel to the polarization plane adjusted with the polarizing plate (3), for example, while the orientation of liquid crystals of the intensity modulation part is offset from the orientation of liquid crystals of the phase modulation part. A specific offset in the orientation of the intensity modulation part is preferably in the range of 30 degrees-60 degrees, more preferably 40 degrees-50 degrees, most preferably 45 degrees. The liquid crystal spatial phase modulation part may exist in the front (polarizing plate side) of the liquid crystal spatial intensity modulation part, or the liquid crystal spatial intensity modulation part may exist in the front.

FIG. 2 is a conceptual diagram of a spatial light modulator having a phase modulation part and an intensity modulation part. As shown in FIG. 2, a spatial light modulator (4) comprises an intensity modulation part (22) having a plurality of liquid crystal cells (21) formed in a line or in a matrix, and a phase modulation part (24) having a plurality of liquid crystal cells (23) corresponding to the liquid crystal cells (21) of the intensity modulation part. The liquid crystal cells (21) of the intensity modulation part (22) and the liquid crystal cells (23) of the phase modulation part (24) each comprise liquid crystal substances as well as electrodes holding the liquid crystal substances therebetween. This electrode may be a transparent electrode or a metal electrode existing anywhere in the circumference of the cells. An example of a specific configuration is such that two liquid crystal elements with a lattice pitch of 10 μm-40 μm are joined together and are mounted on a glass substrate. The lattice pitch is a factor determining the width of each cell. As shown in FIG. 2, a gap may be provided between the adjacent liquid crystal cells (21, 23).

FIG. 3 is a conceptual diagram showing the orientation of an intensity modulation part and a phase modulation part. As shown in FIG. 3, the orientation of the intensity modulation part is 45 degrees offset from that of the phase modulation part, for example. In order for phase modulation and intensity modulation to be performed with these liquid crystal elements, the polarization plane by the polarizing plate may be parallel to the orientation of liquid crystals of the phase modulation part, and the orientation of liquid crystals of the intensity modulation part may be 45 degrees offset from the polarization plane by the polarizing plate. The offset angle in the intensity modulation part may be any value except 0 degree. However, 45 degrees is preferable from a viewpoint of controlling intensity easily.

FIG. 4 are conceptual diagrams for explaining polarization control, intensity control, and phase control. FIG. 4(a) is a diagram showing the intensity modulation and the phase modulation of the present invention. FIG. 4(b) is a diagram showing the optical phase shift when only the intensity modulation is performed. As shown in FIG. 4(b), when only the intensity modulation is performed, intensity is adjusted with an intensity modulator, and linear polarization is changed to circular polarization. Then, circular polarization is changed back to linear polarization with a polarizer. The intensity modulation is performed in this way. However, as shown in FIG. 4(b), though the optical phase is back to liner polarization, the phase state is changed. On the other hand, as shown in FIG. 4(a), in a system having both intensity modulation and phase modulation, the phase modulation compensates the phase shift by the intensity modulation, which allows the phase of output light to be matched with the phase of input light.

A smaller condensing diameter of the liquid crystal cells on the condensing lens side is more preferable as it reduces the width of the obtained bandpass. From this viewpoint, the condensing diameter may be in the range of 20 μm-80 μm, preferably 30 μm-70 μm. And the size of the liquid crystal cells may be 10 μm-40 μm, preferably 15 μm-30 μm, or it may be 15 μm-25 μm. The use of such microscopic cells enables the passbands of a 10 GHz interval. Furthermore, as a wavelength becomes larger, the condensing diameter becomes larger, and thus one light beam on the short wavelength side may be received by two liquid crystal cells while one light beam on the long wavelength side may be received by three liquid crystal cells. The condensing diameter refers to the diameter of the light beam derived from the image formed on the liquid crystal cells by a plurality of light beams condensed by the condensing lens.

A folded reflector (5) is an optical element where the light beams having passed through a spatial light modulator (4) having a phase modulation part and an intensity modulation part are incident and shift the traveling direction. A well-known optical element such as a mirror and a prism can preferably be used as the folded reflector. This adoption of reflection type enables the overlapped use of optical elements and also enables compensating for the influences of dispersion etc., resulting in precise miniaturization of an optical waveform shaping device.

FIG. 5 is a diagram showing an example of an optical waveform shaping device which uses a prism as a folded reflector. As shown in FIG. 5, the use of a prism (26) can ensure vertical or horizontal optical paths. As a result, two kinds of light beams can follow symmetrical optical paths, thereby equalizing the influences such as a noise derived from the optical paths.

Lightwaves are dispersed spatially for each frequency by a grating (1). The spatially-dispersed lightwaves are condensed with a condensing lens (2), and are incident on a spatial light modulator (4) through a polarizing plate (3), where the lightwaves are subjected to separately-controlled phase modulation and intensity modulation. At the spatial light modulator (4), the lightwaves are incident on different cells for each dispersed frequency. FIG. 6 are figures showing a beam incident on cells. FIG. 6(a) shows a light beam on the short wavelength side incident on cells, while FIG. 6(b) shows a light beam on the long wavelength side incident on cells. The cell size is, for example, a 20 μm interval, and the light beam on the short wavelength side may be incident on two cells, while the light beam on the long wavelength side may be incident on three cells. Thus, the light beams in real time can be resolved into frequencies and can be expanded in real space. Furthermore, the number of cells to a certain beam can be adjusted according to the wavelength dispersion characteristic of a grating. Light beams are folded by a folded reflector (5). The folded light beams are condensed with the condensing lens (2), and the spatially-dispersed light beams are multiplexed by a grating (1). Thus, each spatially-dispersed light beam is multiplexed with its phase and intensity adjusted.

The invention has been explained in the above with reference to a reflection type optical waveform shaping device. However, the optical waveform shaping device of the present invention may be a transmission type. Specifically, a transmission type optical waveform shaping device may comprise a grating, a first condensing lens, a polarizing plate, a spatial light modulator having a phase modulation part and an intensity modulation part, a second condensing lens, and an optical multiplexer. The same lens as the first condensing lens may be used as the second condensing lens. The same thing as the grating may be used as the optical multiplexer.

FIG. 7 are figures showing an optical waveform shaping device of the present invention capable of phase shift compensation. FIG. 7(a) shows an example using an existing driver, while FIG. 7(b) shows an example performing DIO direct control. In FIG. 7(a), a control device such as a PC is connected with a voltage control part (32), and the voltage control part has a SLM driver 1 and a SLM driver 2 which control the driving voltage applied to a spatial phase modulation part and a spatial intensity modulation part. On the other hand, in the case of DIO direct control as shown in FIG. 7(b), the driving voltage applied to the spatial phase modulation part and the spatial intensity modulation part is directly controlled in accordance with the instructions from the control device. As shown in FIG. 7, this optical waveform shaping device comprises a spatial light modulator (4), a detection part (31), a control device (32), and a voltage adjustment part (33). And the control device outputs control signals for instructing the voltage adjustment part based on the phase shift detected by the detection part. On the other hand, the voltage adjustment part outputs predetermined voltage to the electrode of each cell according to the received controlled signals. Thus, according to the optical waveform shaping device of the present invention, the phase shift accompanied with intensity modulation can be compensated.

The detection part (31) is an element for detecting output light from the optical waveform shaping device when intensity modulation is performed by an intensity modulation part (22). As the detection part, a well-known detection device such as a photodiode can arbitrarily be employed. The detection part (31) is preferably provided within the chassis of the optical waveform shaping device. Furthermore, the detection part preferably monitors the controlled variable relating to both optical intensity and optical phase.

The control device (32) is a device for receiving information relating to the phase shift of each frequency detected by the detection part (31) and controlling the voltage applied to the electrode of each liquid crystal cell (23) of the phase modulation part (24). Specifically, a computer serves as the control device. The control device may be provided as a unit with the optical waveform shaping device or may be provided externally. In terms of downsizing the device, the control device is preferably provided within the chassis of the optical waveform shaping device. When the detection part monitors the controlled variable relating to both optical intensity and optical phase, such control is preferably performed by a closed loop so that optical intensity and optical phase come closer to a set value following a comparison of measured optical intensity and optical phase with the set value. This control of optical intensity and optical phase can increase the stability of the device.

The voltage adjustment part (33) outputs the voltage applied to the electrodes of each liquid crystal cell (23) of the phase modulation part (24) to each liquid crystal cell of the phase modulator (24) in accordance with the control instructions from the control device (32). Furthermore, instead of feedback control, the orientation direction of a polarizer and the phase modulation part (24) may be adjusted so that phase modulation can be performed to compensate the phase shift by intensity modulation. That is, it is a preferable mode of the present invention to use the orientation direction of liquid crystals of a polarizing plane of the polarizer and the phase modulation part (24) so that phase modulation can be performed to compensate the phase shift by intensity modulation. The intensity modulation part may have a similar configuration so that the intensity variation accompanied with phase modulation.

The optical waveform shaping device of the present invention can be used as a light source for WDM etc. Furthermore, the optical waveform shaping device of the present invention can be used as an optical transmission device for EDFA etc.

As mentioned above, the optical waveform shaping device of the present invention basically employs the configuration comprising a grating part such as an optical multiplexer for multiplexing light beams and a spatial light modulator for controlling the light beams multiplexed in the grating part for every microscopic wavelength zone. In addition to a grating and a prism as mentioned above, a grism can be used in the grating part. FIG. 16 is an example of the grating part using a grism. In this case, the grism is a dispersive element consisting of a combination of a prism and a grating. In the figure, the grism is shown as a "volume phase holographic grating" (VPHG). Light beams from a fiber are collimated by a first collimating lens and are incident on the grism. The light beams incident on the grism are dispersed according to the wavelengths. The dispersed light beams are collimated with a second collimating lens and are output to a fiber through an amplitude shutter and a condensing lens. The grism itself is well-known. Examples of a grism are described in JP-B 3576538, JP-A 2004-130806, etc.

FIG. 17 is a conceptual diagram showing an example of a grism. As shown in FIG. 17, one example of a grism comprises a VPH grating part with a refractive index of $n_2$, glass substrates with a refractive index of $n_0$ at both sides of the VPH grating part, and a first prism and a second prism with a refractive index of n1 provided outside the two glass substrates.

FIG. 18 is a figure showing the relation between the lattice cycle of the VPH grating part and the incidence angle of the grating.

FIG. 19 is a figure showing a modified grism. That is, a grism having three prisms and two volume phase holographic gratings provided in the connecting positions of the three prisms may be used.

Embodiment 1

FIG. 8 is a comprehensive diagram of the optical waveform shaping device according to Embodiment 1. FIG. 9 are schematic diagrams of the optical system according to Embodiment 1. FIG. 9(a) is a top view, while FIG. 9(b) is a side view. In the figures, PBS indicates a polarizing beam splitter, FR indicates a Faraday rotator, SMF indicates a single mode fiber, and 2-PMF indicates a 2-axis polarization-preserving fiber. As shown in FIG. 9, this optical system comprises a 2-axis polarization-preserving fiber (2-PMF), a collimating lens with a diameter of 15 cm and a focal length of 6 cm, a grating having a surface center position at 6 cm from the collimating lens, a condensing lens (f15 cm) positioned at 15 cm from the surface center position of the grating, a polarizing plate, a liquid crystal spatial intensity adjustment part, a liquid crystal spatial phase modulation part, and a folded reflector. The position of the folded reflector (prism) was set at 15 cm from the condensing lens. The width of the control part of each liquid cell was set 17 μm, and the size of the gap part was set 3 μm. That is, one cell size was 20 μm. The distance between the collimating lens and the grating and the distance between the collimating lens and the condensing lens were calculated by doing simulation as shown in FIG. 10.

Phases fluctuate sensitively to the changes such as tension or temperature of a fiber. As this embodiment employs the above configuration, when the two optical paths of fibers are replaced with each other, the outward path and the return path will receive the same phase shift in total. As a result, though fibers etc. lack phase stability, an optical waveform shaping device with high phase stability can be provided.

FIG. 11 are figures showing an example of a liquid crystal spatial light modulator. FIG. 11(a) through FIG. 11(c) are figures showing an overview of the actually manufactured spatial light modulator. The spatial optical modulator shown in FIG. 11(a) used a glass substrate with a width of 65 mm×48 mm and a thickness of 0.5 mm. The size of a liquid crystal cell gap located between glass substrates having a common electrode and a pattern electrode respectively was set 8 μm. The width of a liquid crystal lattice was 14×14 mm, and it was installed near the center of the glass substrates. The pitch of the liquid crystal lattice was 20 μm (specifically, the control area was 17 μm and the gap was 3 μm). As for the orientation of liquid crystals, the orientation direction was set 45 degrees in case of intensity control, and it was set 0 degree in case of phase control. The liquid crystal spatial light modulator for intensity control and the liquid crystal spatial light modulator for phase control were prepared separately.

In FIG. 11(b), the glass substrate with a width of 65× up to 30 mm and a thickness of 0.3 mm was used. The size of a liquid crystal cell gap located between glass substrates having a common electrode and a pattern electrode respectively was set 8 μm. The liquid crystal lattice with a size of 10 mm× up to 5 mm was used. In FIG. 11(b), the liquid crystal spatial light modulator was put to either the left or the right of the glass substrate. This intentional arrangement of the liquid crystal light modulator away from the center enabled easier preparation. As a pitch of the liquid crystal lattice, the following three patterns were manufactured:

(i) Pitch of liquid crystal lattice: 20 μm (control area: 17 μm, gap: 3 μm)

(ii) Pitch of liquid crystal lattice: 20 μm (control area: 18 μm, gap: 2 μm)

(iii) Pitch of liquid crystal lattice: 10 μm (control area: 8 μm, gap: 2 μm)

As for the orientation of liquid crystals, the orientation direction was set 45 degrees in case of intensity control, and it was set 0 degree in case of phase control. The liquid crystal spatial light modulator for intensity control and the liquid crystal spatial light modulator for phase control were prepared separately. When connecting the two liquid crystal elements, a marker for positioning the lattices was provided. Furthermore, control ICs were collectively arranged on one side of the glass substrate.

In the spatial light modulator as shown in FIG. 11(c), a liquid crystal spatial light modulator for intensity control and a liquid crystal spatial light modulator for phase control are provided on each of the surface and the rear surface respectively of the glass substrate having a pattern electrode. These were prepared with the portion of the lattices aligned. As shown in FIG. 11(c), this liquid crystal spatial light modulator has the configuration where the glass substrate having the pattern electrode is put between two substrates having a common electrode. The size of a liquid crystal cell gap located between glass substrates each having a common electrode and a pattern electrode was set 8 μm. The liquid crystal lattice with a size of up to 20 mm× up to 5 mm was used. In FIG. 11(c), the liquid crystal spatial light modulator was put to either the left or the right of the glass substrate. This intentional arrangement of the liquid crystal light modulator away from the center enabled easier preparation. As a pitch of the liquid crystal lattice, the following three patterns were manufactured:

(i) Pitch of liquid crystal lattice: 20 μm (control area: 17 μm, gap: 3 μm)

(ii) Pitch of liquid crystal lattice: 20 μm (control area: 18 μm, gap: 2 μm)

(iii) Pitch of liquid crystal lattice: 10 μm (control area: 8 μm, gap: 2 μm)

As for the orientation of liquid crystals, the orientation direction was set 45 degrees in case of intensity control, and it was set 0 degree in case of phase control. The liquid crystal spatial light modulator for intensity control and the liquid crystal spatial light modulator for phase control were prepared as a unit with the glass substrate having a pattern electrode in common.

FIG. 12 are graphs replaced with drawings showing the optical intensity control characteristic of an optical waveform shaping device. FIG. 12(a) shows a graph of measurement of the optical intensity control characteristic when an ASE light source is used and all the channels are controlled collectively. FIG. 12(b) shows a graph of measurement of the optical intensity control characteristic when all the channels are intermediately controlled. FIG. 12(c) shows a graph of measurement of the optical intensity control characteristic when all the channels are OFF controlled. FIG. 12(a) shows that the passbands of adjacent bands forms continuous passbands in the optical waveform shaping device of the present invention. On the other hand, FIG. 12(b) shows that the intensity control variable can be set arbitrarily within the control range. FIG. 12(c) shows that output can be suppressed in case of OFF control.

FIG. 13 are graphs replaced with drawings showing frequency spacing of an optical waveform shaping device. The wavelength of a wavelength variable LD light source was swept at a 0.01 nm step, and the power of each wavelength with optical intensity controlled was measured with a power meter. The optical intensity control was set for every 1 CH, and the frequency spacing was checked. FIG. 13(a) shows a frequency spacing in case of one ON, FIG. 13(b) shows a frequency spacing in case of two adjacent ON, FIG. 13(c) shows a frequency spacing in case of three ON, and FIG. 13(d) shows a frequency spacing in case of two separate ON.

FIG. 14 is a graph replaced with a drawing showing the spatial resolution of an optical waveform shaping device. An ASE light source was used and the optical intensity was controlled for every 48 CH (ON as a whole; OFF control for every 48 CH). The spatial resolution per PAL-SLM cell in each wavelength band was measured from the control wavelength difference. As a result, the spatial resolution was 12.1 GHz/cell at a wavelength of 1535 nm, the spatial resolution was 10.7 GHz/cell at a wavelength of 1550 nm, and the spatial resolution was 9.2 GHz/cell at a wavelength of 1565 nm.

FIG. 15 is a schematic diagram showing a device configuration for measuring an insertion loss. As a result, the insertion loss was 6.5 dB at a wavelength of 1535 nm, the insertion loss was 5.0 dB at a wavelength of 1550 nm, and the insertion loss was 7.5 dB at wavelength of 1565 nm.

Table 1 is a table showing the dispersion characteristic of a grating.

TABLE 1

| Wavelength | Incident angle | Diffraction angle | Diffraction efficiency |
|---|---|---|---|
| 1540 nm | 50 deg | 68.9 deg | 87.0% |
| 1550 nm | 50 deg | 70.0 deg | 88.2% |
| 1560 nm | 50 deg | 71.2 deg | 89.1% |

Table 2 is a table showing the diameter of a PAL-SLM incident beam.

TABLE 2

| Wavelength | Condensing diameter (x-axis) | Condensing diameter (y-axis) |
|---|---|---|
| 1530 nm | Φx - 40 μm | Φx - 74 μm |
| 1550 nm | Φx - 38 μm | Φx - 65 μm |
| 1570 nm | Φx - 45 μm | Φx - 86 μm |

Industrial Applicability

The optical waveform shaping device of the present invention is preferably used in the fields such as optical information and communication.

Brief Description Of The Drawings

FIG. 4 are conceptual diagrams for explaining polarization control, intensity control, and phase control.

FIG. 6 are figures showing a beam incident on cells. FIG. 6(a) shows a light beam on the short wavelength side incident on cells, while FIG. 6(b) shows a light beam on the long wavelength side incident on cells.

FIG. 7 are figures showing an optical waveform shaping device of the present invention capable of phase shift compensation. FIG. 7(a) shows an example using an existing driver, while FIG. 7(b) shows an example performing DIO direct control.

FIG. 9 are schematic diagrams of the optical system according to Embodiment 1. FIG. 9(a) is a top view, while FIG. 9(b) is a side view.

FIG. 11 are figures showing an example of a liquid crystal spatial light modulator. FIG. 11(a) through FIG. 11(c) are figures showing an overview of the actually manufactured spatial light modulator.

FIG. 12 are graphs replaced with drawings showing the optical intensity control characteristic of an optical waveform shaping device. FIG. 12(a) shows a graph of measurement of the optical intensity control characteristic when an ASE light source is used and all the channels are controlled collectively. FIG. 12(b) shows a graph of measurement of the optical intensity control characteristic when all the channels are intermediately controlled. FIG. 12(c) shows a graph of measurement of the optical intensity control characteristic when all the channels are OFF controlled FIG. 13 are graphs replaced with drawings showing frequency spacing of an optical waveform shaping device. The wavelength of a wavelength variable LD light source was swept at a 0.01 nm step, and the power of each wavelength with optical intensity controlled was measured with a power meter. The optical intensity control was set for every 1 CH, and the frequency spacing was checked. FIG. 13(a) shows a frequency spacing in case of one ON, FIG. 13(b) shows a frequency spacing in case of two adjacent ON, FIG. 13(c) shows a frequency spacing in case of three ON, and FIG. 13(d) shows a frequency spacing in case of two separate ON.

Figure 1:
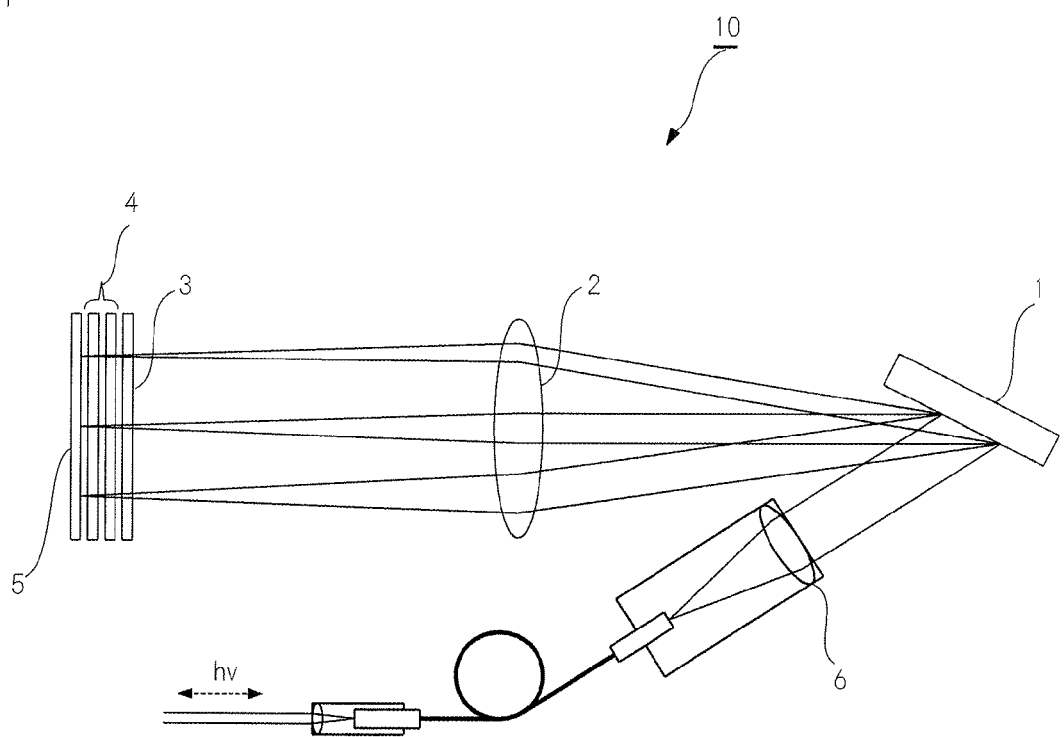
FIG. 1 is a conceptual diagram showing a configuration example of an optical waveform shaping device of the present invention.
Figure 2:
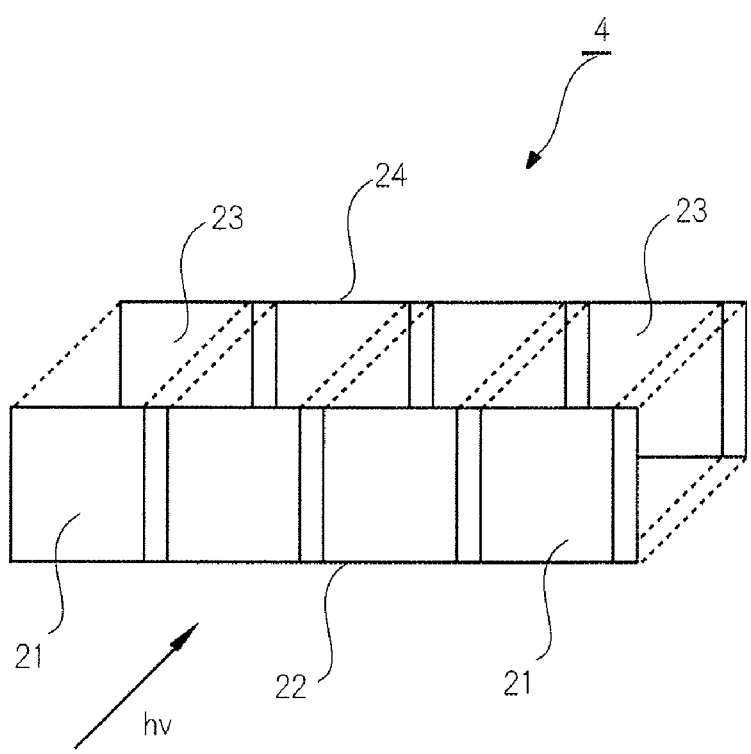
FIG. 2 is a conceptual diagram of a spatial optical modulator having a phase modulation part and an intensity modulation part.
Figure 3:
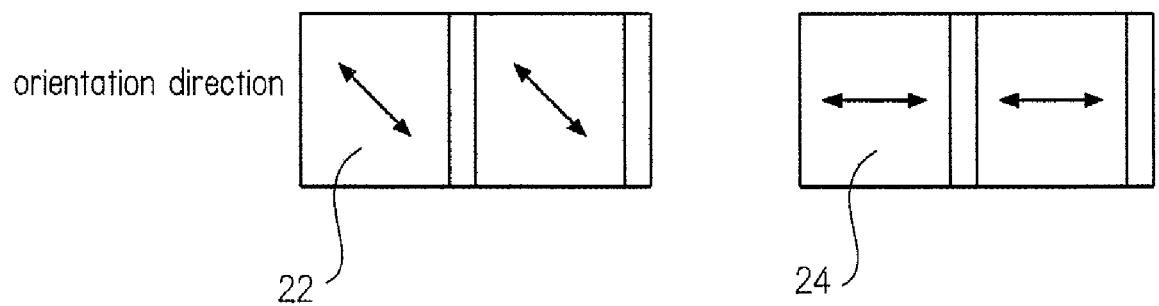
FIG. 3 is a conceptual diagram showing the orientation of an intensity modulation part and a phase modulation part.
Figure 5:
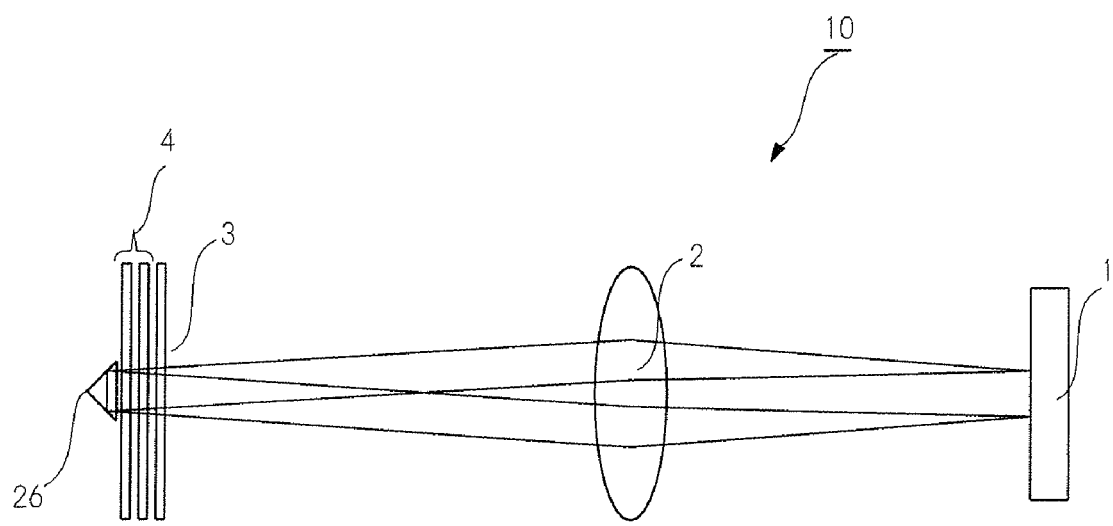
FIG. 5 is a diagram showing an example of an optical waveform shaping device which uses a prism as a folded reflector.
Figure 8:
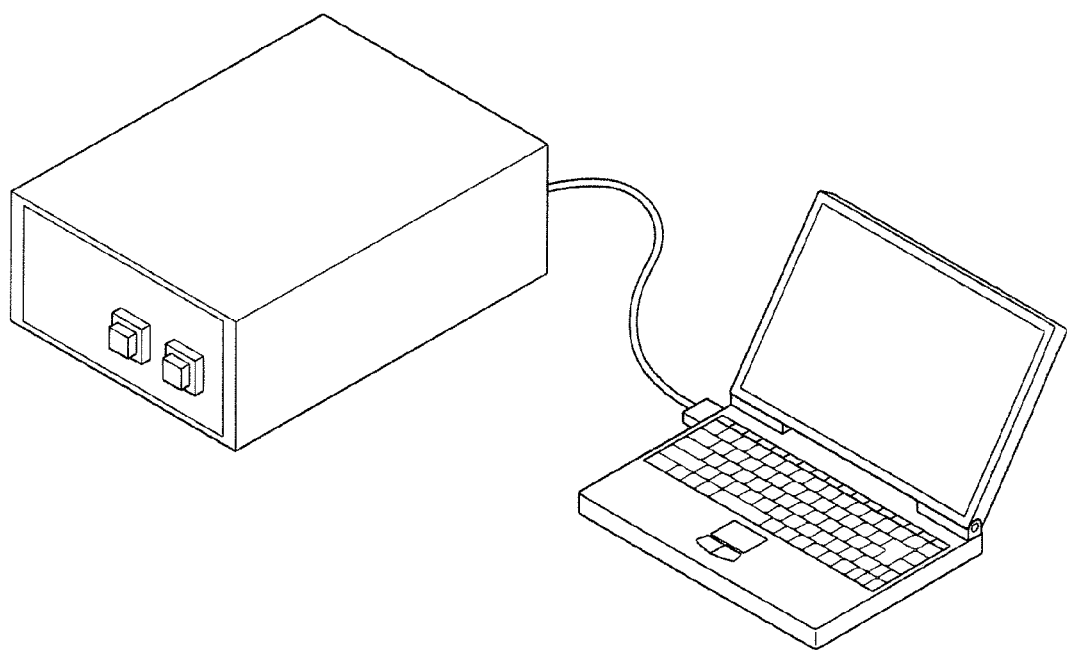
FIG. 8 is a comprehensive diagram of the optical waveform shaping device according to Embodiment 1.
Figure 10:
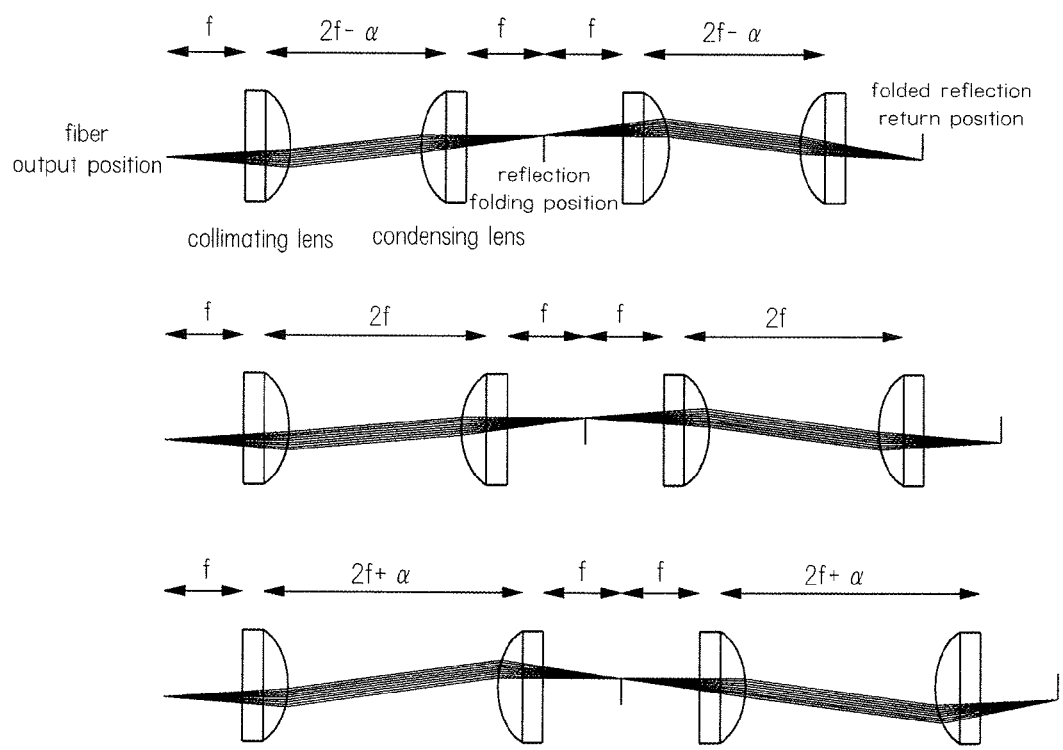
FIG. 10 is a schematic diagram of a simulation determining the position of an optical element.
Figure 14:
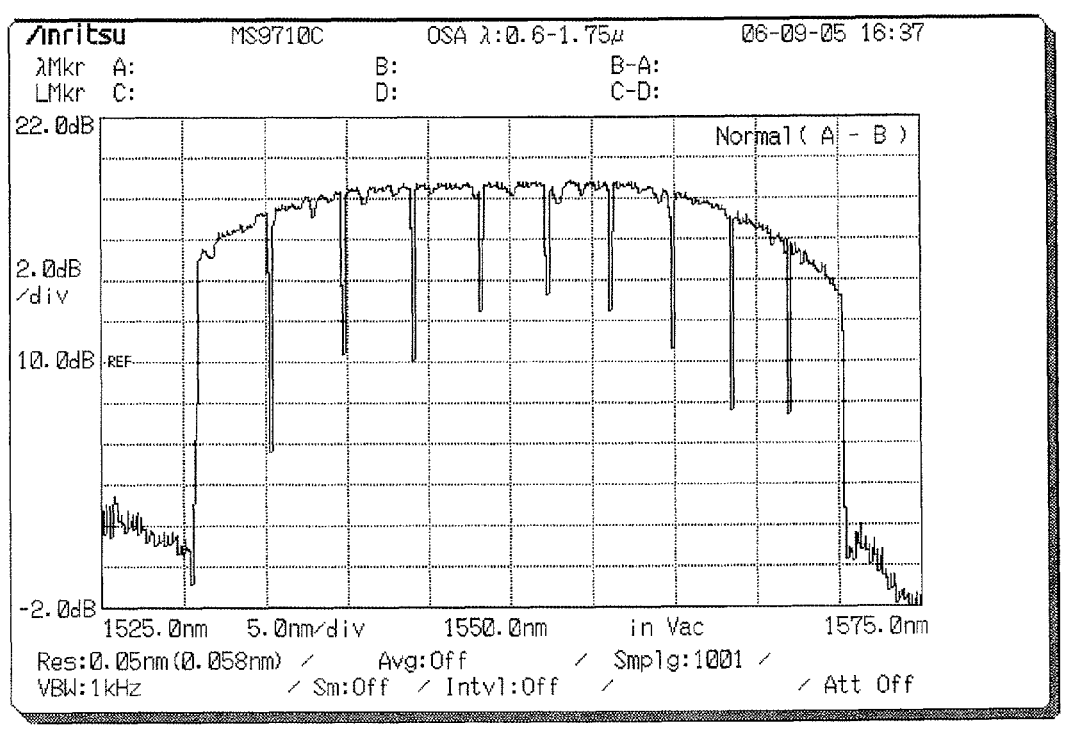
FIG. 14 shows a graph replaced with a drawing showing the spatial resolution of an optical waveform shaping device.
Figure 15:
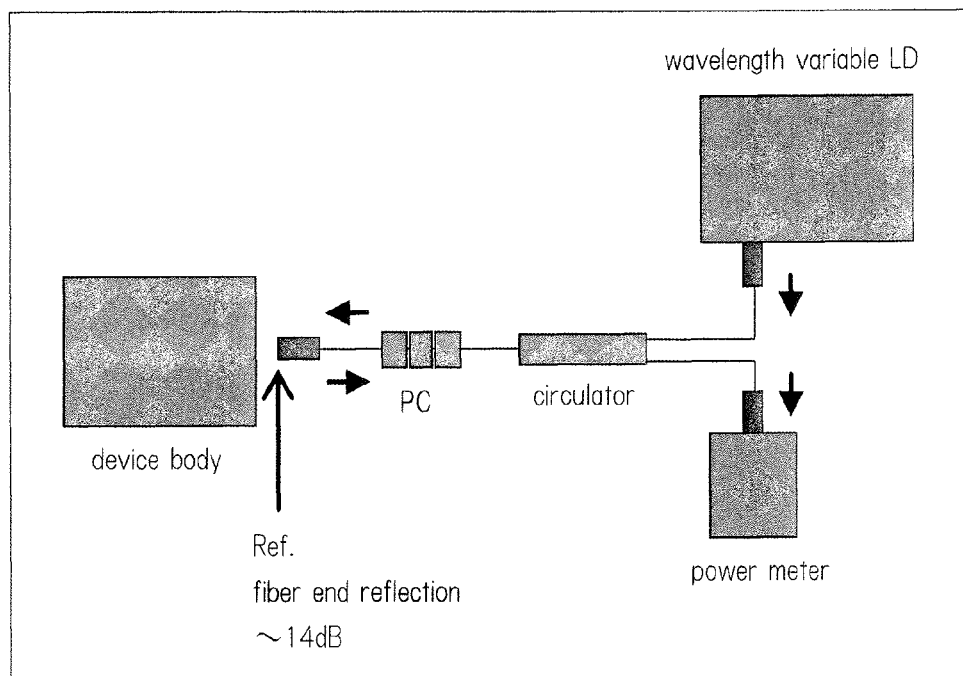
FIG. 15 is a schematic diagram showing the device configuration for measuring an insertion loss.
Figure 16:
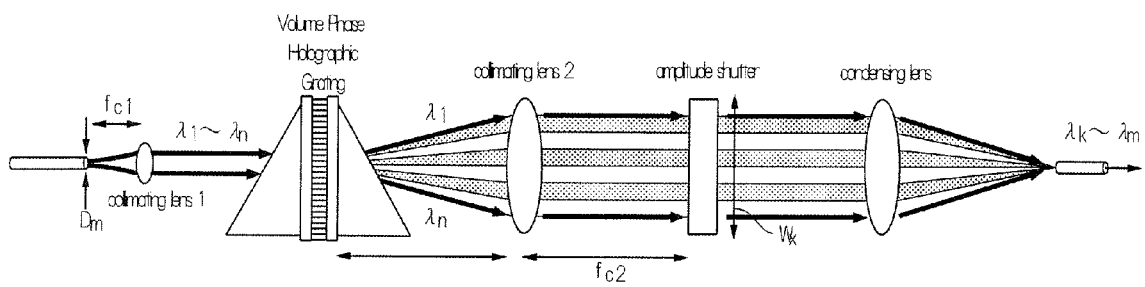
FIG. 16 is an example of the grating part using a grism.
Figure 17:
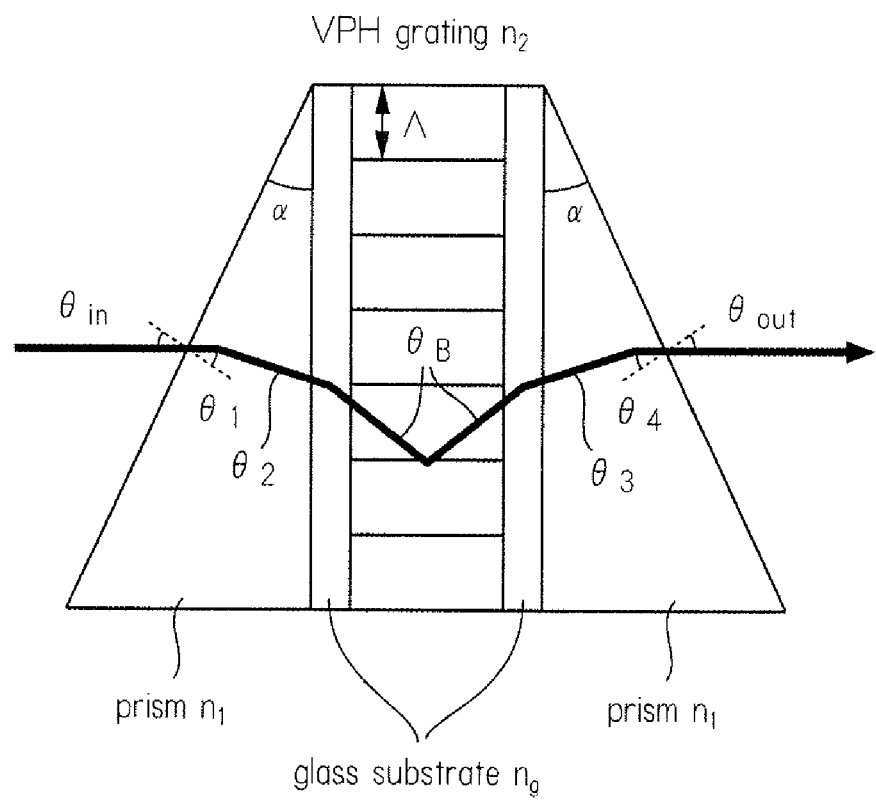
FIG. 17 is a conceptual diagram showing an example of a grism.
Figure 18:
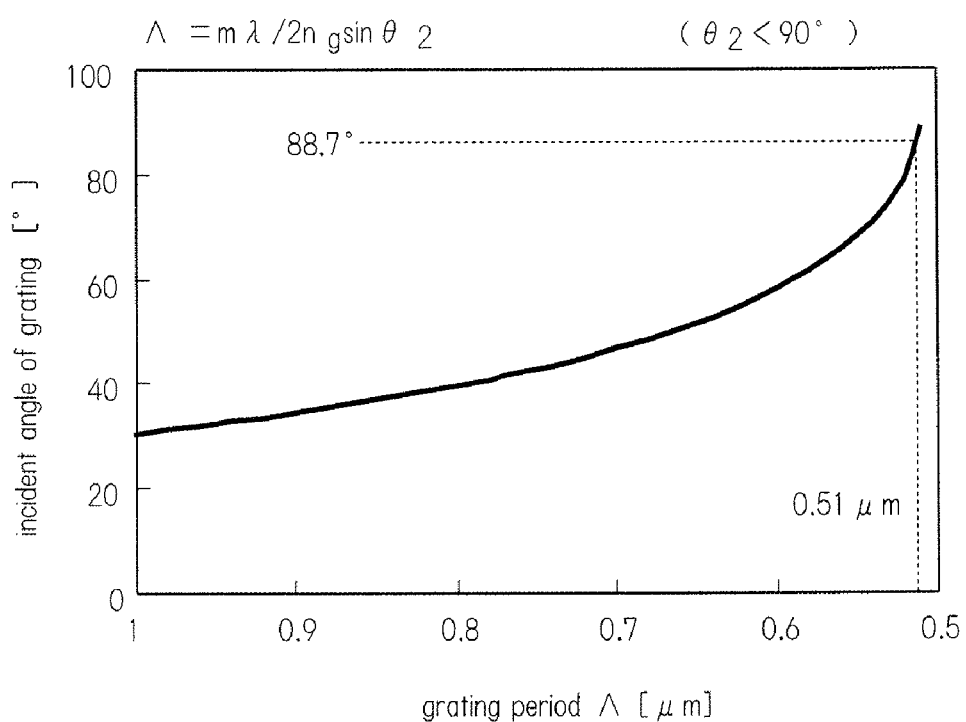
FIG. 18 is a figure showing the relation between the lattice cycle of a VPH grating part and the incidence angle of a grating.
Figure 19:
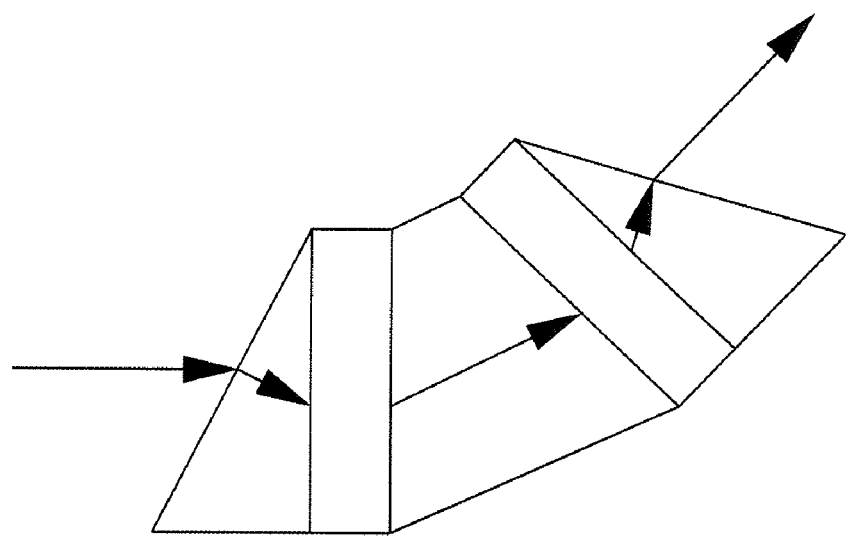
FIG. 19 is a figure showing a modified grism.

| | Description of the Numerals |
|---|---|
| 1 | Branching filter |
| 2 | Condensing part |
| 3 | Polarizing plate |
| 4 | Spatial light modulator |
| 10 | Optical waveform shaping device |

The invention claimed is:

1. An optical waveform shaping device (10) comprising:
a branching filter (1) for branching the light beam from a light source into light beams of each frequency;
a condensing part (2) for condensing a plurality of light beams branched by the branching filter (1);
a polarizing plate (3) for adjusting the polarization planes of the light beams having passed through the condensing part (2); and
a spatial light modulator (4) having a phase modulation part and an intensity modulation part where the light beams having passed through the polarizing plate (3) are incident,
the phase modulation part and the intensity modulation part being adjacent to each other across one glass substrate and having the glass substrate in common,
the optical waveform shaping device (10), connected with a control device (32), further comprising a detection part (31) and a voltage adjustment part (33),
the detection part (31) being for detecting the phase shift accompanied with intensity modulation by the intensity modulation part (22),
the control device (32) being for directly controlling the driving voltage applied to the phase modulation part (24) as well as directly controls the driving voltage applied to the intensity modulation part (22),
the voltage adjustment part (33) being for outputting voltage to the phase modulation part (24),
wherein the control device (32) outputs control signals for instructing the voltage adjustment part (33) based on the phase shift detected by the detection part (31), and the voltage adjustment part (33) outputs predetermined voltage to the electrodes of the liquid crystal cells of the phase modulation part (24) according to the control signals received from the control device (32), whereby the phase shift accompanied with intensity modulation is compensated.

2. The optical waveform shaping device as claimed in claim 1, wherein the branching filter (1) comprises a high-dispersion element.

3. The optical waveform shaping device as claimed in claim 1,
wherein the spatial light modulator (4) comprises:
an intensity modulation part (22) having a plurality of liquid crystal cells (21) formed in a line or in a matrix; and
a phase modulation part (24) having a plurality of liquid crystal cells (23) corresponding to the liquid crystal cells (21) of the intensity modulation part,
and wherein the orientation of liquid crystals of the intensity modulation part is 45 degrees offset from the orientation of liquid crystals of the phase modulation part.

4. The optical waveform shaping device as claimed in claim 1,
wherein the spatial light modulator (4) comprises:
an intensity modulation part (22) having a plurality of liquid crystal cells (21) formed in a line or in a matrix; and
a phase modulation part (24) having a plurality of liquid crystal cells (23) corresponding to the liquid crystal cells (21) of the intensity modulation part,
wherein each of the liquid crystal cells (21) of the intensity modulation part (22) and the liquid crystal cells (23) of the phase modulation part (24) comprises liquid crystal substances and electrodes which exist holding the liquid crystal substances therebetween, and wherein the optical waveform shaping device comprises:

a detection part (31) for detecting output light from the optical waveform shaping device (21) when the intensity modulation by the intensity modulation part (22) is performed;

a control device (32) for receiving information on the optical phase shifting of each frequency detected by the detection part (31) and controlling the voltage applied to the electrodes of each liquid crystal cell (23) of the phase modulation part (24);

a voltage adjustment part (33) for each liquid crystal cell of the phase modulation part (24) which outputs the voltage applied to the electrodes of each liquid crystal cell (23) of the phase modulator (24) in accordance with the control instructions from the control device (32).

5. The optical waveform shaping device (10) as claimed in claim 1, further comprising a reflective part (5) where the light beams having passed through the spatial light modulator (4) are incident.

6. The optical waveform shaping device (10) as claimed in claim 1, further comprising a second condensing lens (11) where the light beams having passed through the spatial light modulator (4), and an optical multiplexer (12) where the light beams having passed through the second condensing lens (11) are incident to multiplex the light beams separated into a plurality of frequencies.

7. An optical waveform shaping device (10) comprising:

a grating (1) for branching the light beam from a light source into light beams of each frequency;

a condensing lens (2) for condensing the plurality of light beams branched by the grating (1);

a polarizing plate(3) for adjusting the polarization planes of the light beams having passed through the condensing lens (2);

a spatial light modulator (4) having a phase modulation part and an intensity modulation part where the light beams having passed through the polarizing plate (3) are incident, wherein the orientation of liquid crystals of the phase modulation part is parallel to the polarization planes adjusted by the polarizing plate (3), the phase modulation part and the intensity modulation part each having a plurality of liquid crystal cells in a line or in a matrix existing in corresponding spatial positions, and the orientation of liquid crystals of the intensity modulation part is 45 degrees offset from the orientation of liquid crystals of the phase modulation part; and a folded reflector (5) where the light beams having passed through the spatial light modulator (4) are incident, the phase modulation part and the intensity modulation part being adjacent to each other across one glass substrate and having the glass substrate in common, wherein the light beam from a light source is frequency separated and is dispersed spatially by the grating (1), wherein the frequency separated and spatially dispersed light beams are condensed by the condensing lens (2), wherein the polarization planes of the condensed light beams are adjusted by the polarizing plate (3), and wherein the light beams with the polarization planes adjusted separately are subjected to separately controlled phase modulation and intensity modulation by the spatial light modulator (4), the light beams folded by the folded reflector (5), condensed through the condensing lens (2) and the frequency separated light beams multiplexed by the grating (1), the optical waveform shaping device (10), connected with a control device (32), further comprising a detection part (31) and a voltage adjustment part (33), the detection part (31) being for detecting the phase shift accompanied with intensity modulation by the intensity modulation part (22), the control device (32) being for directly controlling the driving voltage applied to the phase modulation part (24) as well as directly controls the driving voltage applied to the intensity modulation part (22), the voltage adjustment part (33) being for outputting voltage to the phase modulation part (24), wherein the control device (32) outputs control signals for instructing the voltage adjustment part (33) based on the phase shift detected by the detection part (31), and the voltage adjustment part (33) outputs predetermined voltage to the electrodes of the liquid crystal cells of the phase modulation part (24) according to the control signals received from the control device (32), whereby the phase shift accompanied with intensity modulation is compensated.

8. The optical waveform shaping device (10) as claimed in claim 1,
wherein the polarizing plate (3) is an interference film type polarizer.

9. The optical waveform shaping device (10) comprising:

a branching filter (1) for branching the light beam from a light source into light beams of each frequency;

a condensing part (2) for condensing a plurality of light beams branched by the branching filter (1);

a polarizing plate (3) for adjusting the polarization planes of the light beams having passed through the condensing part (2); and a spatial light modulator (4) having a phase modulation part and an intensity modulation part where the light beams having passed through the polarizing plate (3) are incident, the optical waveform shaping device (10), connected with a control device (32), further comprising a detection part (31) and a voltage adjustment part (33), the detection part (31) being for detecting the phase shift accompanied with intensity modulation by the intensity modulation part (22), the control device (32) being for directly controlling the driving voltage applied to the phase modulation part (24) as well as directly controls the driving voltage applied to the intensity modulation part (22), the voltage adjustment part (33) being for outputting voltage to the phase modulation part (24), wherein the control device (32) outputs control signals for instructing the voltage adjustment part (33) based on the phase shift detected by the detection part (31), and the voltage adjustment part (33) outputs predetermined voltage to the electrodes of the liquid crystal cells according to the control signals received from the control device (32), whereby the phase shift accompanied with intensity modulation is compensated.

10. The optical waveform shaping device (10) as claimed in claim 1,
wherein the spatial light modulator comprises liquid crystal cells, and is arranged on the glass substrate put to either left or right of the glass substrate away from the center.

* * * * *